US009077960B2

(12) United States Patent
Srinivasan et al.

(10) Patent No.: US 9,077,960 B2
(45) Date of Patent: Jul. 7, 2015

(54) NON-ZERO COEFFICIENT BLOCK PATTERN CODING

(75) Inventors: Sridhar Srinivasan, Redmond, WA (US); Chengjie Tu, Sammamish, WA (US); Shankar Regunathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1570 days.

(21) Appl. No.: 11/203,007

(22) Filed: Aug. 12, 2005

(65) Prior Publication Data

US 2007/0036222 A1    Feb. 15, 2007

(51) Int. Cl.
*H04N 7/12* (2006.01)
*H04N 19/14* (2014.01)
*H04N 19/132* (2014.01)
*H04N 19/176* (2014.01)
*H04N 19/593* (2014.01)
*H04N 19/46* (2014.01)
*H04N 19/91* (2014.01)

(52) U.S. Cl.
CPC ... *H04N 19/00157* (2013.01); *H04N 19/00127* (2013.01); *H04N 19/00278* (2013.01); *H04N 19/00763* (2013.01); *H04N 19/00545* (2013.01); *H04N 19/00951* (2013.01)

(58) Field of Classification Search
CPC ........................... H04N 7/50; H04N 19/00157
USPC ..................................................... 375/240.18
See application file for complete search history.

(56) References Cited

U.S. PATENT DOCUMENTS

| 4,454,546 | A | 6/1984 | Mori |
| 4,691,329 | A | 9/1987 | Juri et al. |
| 4,796,087 | A | 1/1989 | Guichard et al. |
| 4,800,432 | A | 1/1989 | Barnett et al. |

(Continued)

FOREIGN PATENT DOCUMENTS

| CN | 1201577 | 12/1998 |
| CN | 1276650 | 12/2000 |

(Continued)

OTHER PUBLICATIONS

Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).

(Continued)

*Primary Examiner* — Sath V Perungavoor
*Assistant Examiner* — James Pontius
(74) *Attorney, Agent, or Firm* — Micah Goldsmith; Judy Yee; Micky Minhas

(57) ABSTRACT

A block transform-based digital media codec efficiently compresses digital media data using block patterns representing whether a block's coefficients are zero-valued, such that their explicit encoding is skipped. Because the block patterns can have widely varying probability distributions, the codec adaptively chooses a prediction mode for modifying the block patterns (e.g., based on spatial prediction, or inverting) to enhance their compression using entropy coding techniques. Further, with high spatial correlation of block patterns, the codec encodes a meta block pattern for a region indicating whether all block patterns of the region represent zero-valued coefficient blocks. In such cases, the codec can then also omit explicitly encoding the block patterns in those regions.

17 Claims, 9 Drawing Sheets

(56) References Cited

U.S. PATENT DOCUMENTS

| | | |
|---|---|---|
| 4,849,812 A | 7/1989 | Borgers et al. |
| 4,999,705 A | 3/1991 | Puri |
| 5,021,879 A | 6/1991 | Vogel |
| 5,068,724 A | 11/1991 | Krause et al. |
| 5,089,887 A | 2/1992 | Robert et al. |
| 5,091,782 A | 2/1992 | Krause et al. |
| 5,111,292 A | 5/1992 | Kuriacose et al. |
| 5,117,287 A | 5/1992 | Koike et al. |
| 5,155,594 A | 10/1992 | Bernstein et al. |
| 5,157,490 A | 10/1992 | Kawai et al. |
| 5,175,618 A | 12/1992 | Ueda |
| 5,193,004 A | 3/1993 | Wang et al. |
| 5,223,949 A | 6/1993 | Honjo |
| 5,227,878 A | 7/1993 | Puri et al. |
| 5,258,836 A | 11/1993 | Murata |
| 5,274,453 A | 12/1993 | Maeda |
| 5,287,420 A | 2/1994 | Barrett |
| 5,317,397 A | 5/1994 | Odaka et al. |
| 5,319,463 A | 6/1994 | Hongu et al. |
| 5,335,299 A | 8/1994 | Atkinson |
| 5,343,248 A | 8/1994 | Fujinami |
| 5,347,308 A | 9/1994 | Wai |
| 5,376,968 A | 12/1994 | Wu et al. |
| 5,376,971 A | 12/1994 | Kadono et al. |
| 5,379,351 A | 1/1995 | Fandrianto et al. |
| 5,400,075 A | 3/1995 | Savatier |
| 5,412,430 A | 5/1995 | Nagata |
| 5,412,435 A | 5/1995 | Nakajima |
| RE34,965 E | 6/1995 | Sugiyama |
| 5,422,676 A | 6/1995 | Herpel et al. |
| 5,424,779 A | 6/1995 | Odaka |
| 5,426,464 A | 6/1995 | Casavant et al. |
| 5,428,396 A | 6/1995 | Yagasaki |
| 5,442,400 A | 8/1995 | Sun |
| 5,448,297 A | 9/1995 | Alattar et al. |
| 5,453,799 A | 9/1995 | Yang et al. |
| 5,461,421 A | 10/1995 | Moon |
| RE35,093 E | 11/1995 | Wang et al. |
| 5,465,118 A | 11/1995 | Hancock et al. |
| 5,467,086 A | 11/1995 | Jeong |
| 5,467,136 A | 11/1995 | Odaka |
| 5,477,272 A | 12/1995 | Zhang et al. |
| RE35,158 E | 2/1996 | Sugiyama |
| 5,510,840 A | 4/1996 | Yonemitsu et al. |
| 5,517,327 A | 5/1996 | Nakatani et al. |
| 5,539,466 A | 7/1996 | Igarashi et al. |
| 5,544,286 A | 8/1996 | Laney |
| 5,546,129 A | 8/1996 | Lee |
| 5,550,541 A | 8/1996 | Todd |
| 5,552,832 A * | 9/1996 | Astle ............... 375/240.24 |
| 5,565,922 A | 10/1996 | Krause |
| 5,594,504 A | 1/1997 | Ebrahimi |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,648,819 A | 7/1997 | Tranchard |
| 5,654,771 A | 8/1997 | Tekalp et al. |
| 5,666,461 A | 9/1997 | Igarashi et al. |
| 5,668,608 A | 9/1997 | Lee |
| 5,668,932 A | 9/1997 | Laney |
| 5,673,339 A | 9/1997 | Lee |
| 5,673,370 A | 9/1997 | Laney |
| 5,687,097 A | 11/1997 | Mizusawa et al. |
| 5,689,306 A | 11/1997 | Jung |
| 5,692,063 A | 11/1997 | Lee et al. |
| 5,699,117 A | 12/1997 | Uramoto et al. |
| 5,699,476 A | 12/1997 | Van Der Meer |
| 5,701,164 A | 12/1997 | Kato |
| 5,748,789 A | 5/1998 | Lee et al. |
| 5,764,807 A | 6/1998 | Pearlman et al. |
| 5,764,814 A | 6/1998 | Chen et al. |
| 5,767,898 A | 6/1998 | Urano et al. |
| 5,784,175 A | 7/1998 | Lee |
| 5,796,438 A | 8/1998 | Hosono |
| RE35,910 E | 9/1998 | Nagata et al. |
| 5,825,830 A | 10/1998 | Kopf |
| 5,831,559 A | 11/1998 | Agarwal et al. |
| 5,835,144 A | 11/1998 | Matsumura et al. |
| 5,835,149 A | 11/1998 | Astle |
| 5,847,776 A | 12/1998 | Khmelnitsky |
| 5,874,995 A | 2/1999 | Naimpally et al. |
| 5,946,042 A | 8/1999 | Kato |
| 5,946,043 A | 8/1999 | Lee et al. |
| 5,946,419 A | 8/1999 | Chen et al. |
| 5,949,489 A | 9/1999 | Nishikawa et al. |
| 5,959,673 A | 9/1999 | Lee et al. |
| 5,963,258 A | 10/1999 | Nishikawa et al. |
| 5,970,173 A | 10/1999 | Lee et al. |
| 5,970,175 A | 10/1999 | Nishikawa et al. |
| 5,973,743 A | 10/1999 | Han |
| 5,974,184 A | 10/1999 | Eifrig |
| 5,982,437 A | 11/1999 | Okazaki et al. |
| 5,982,438 A | 11/1999 | Lin et al. |
| 5,990,960 A | 11/1999 | Murakami et al. |
| 6,002,439 A | 12/1999 | Murakami et al. |
| RE36,507 E | 1/2000 | Iu |
| 6,011,596 A | 1/2000 | Burl et al. |
| 6,026,195 A | 2/2000 | Eifrig et al. |
| 6,035,070 A | 3/2000 | Moon et al. |
| 6,040,863 A | 3/2000 | Kato |
| 6,052,150 A | 4/2000 | Kikuchi |
| 6,094,225 A | 7/2000 | Han |
| RE36,822 E | 8/2000 | Sugiyama |
| 6,097,759 A | 8/2000 | Murakami et al. |
| 6,122,318 A | 9/2000 | Yamaguchi et al. |
| 6,148,033 A | 11/2000 | Pearlstein et al. |
| 6,148,109 A | 11/2000 | Boon et al. |
| 6,154,495 A | 11/2000 | Yamaguchi et al. |
| 6,188,794 B1 | 2/2001 | Nishikawa et al. |
| 6,192,081 B1 | 2/2001 | Chiang et al. |
| 6,201,927 B1 | 3/2001 | Comer |
| 6,205,176 B1 | 3/2001 | Sugiyama |
| 6,208,761 B1 | 3/2001 | Passagio et al. |
| 6,215,905 B1 | 4/2001 | Lee et al. |
| 6,236,806 B1 | 5/2001 | Kojima et al. |
| RE37,222 E | 6/2001 | Yonemitsu et al. |
| 6,243,418 B1 | 6/2001 | Kim |
| 6,259,810 B1 | 7/2001 | Gill et al. |
| 6,271,885 B2 | 8/2001 | Sugiyama |
| 6,275,528 B1 | 8/2001 | Isozaki et al. |
| 6,275,531 B1 | 8/2001 | Li |
| 6,292,585 B1 | 9/2001 | Yamaguchi et al. |
| 6,304,928 B1 | 10/2001 | Mairs et al. |
| 6,307,973 B2 | 10/2001 | Nishikawa et al. |
| 6,324,216 B1 | 11/2001 | Igarashi et al. |
| 6,332,003 B1 | 12/2001 | Matsuura et al. |
| 6,351,563 B1 | 2/2002 | Kim et al. |
| 6,385,345 B1 | 5/2002 | Ribas-Corbera et al. |
| 6,404,813 B1 | 6/2002 | Haskell et al. |
| 6,408,029 B1 | 6/2002 | McVeigh et al. |
| 6,496,601 B1 | 12/2002 | Migdal et al. |
| 6,563,953 B2 | 5/2003 | Lin et al. |
| 6,573,905 B1 | 6/2003 | MacInnis et al. |
| 6,614,442 B1 | 9/2003 | Ouyang et al. |
| 6,671,323 B1 | 12/2003 | Tahara et al. |
| 6,683,987 B1 | 1/2004 | Sugahara |
| 6,704,360 B2 | 3/2004 | Haskell et al. |
| 6,728,317 B1 | 4/2004 | Demos |
| 6,735,345 B2 | 5/2004 | Lin et al. |
| 6,765,963 B2 | 7/2004 | Karczewicz et al. |
| 6,778,606 B2 | 8/2004 | Kang et al. |
| 6,785,331 B1 | 8/2004 | Jozawa et al. |
| 6,795,584 B2 | 9/2004 | Karczewicz et al. |
| 6,798,364 B2 | 9/2004 | Chen et al. |
| 6,819,714 B2 | 11/2004 | Yamada et al. |
| 6,862,402 B2 | 3/2005 | Kim |
| 6,920,175 B2 | 7/2005 | Karczewicz et al. |
| 6,937,653 B2 * | 8/2005 | Song et al. ............... 375/240.03 |
| 6,975,680 B2 | 12/2005 | Demos |
| 7,054,494 B2 | 5/2006 | Lin et al. |
| 7,116,713 B2 * | 10/2006 | Hagiwara ............... 375/240.03 |
| 7,127,114 B2 | 10/2006 | Lin et al. |
| 7,289,673 B2 | 10/2007 | Lin et al. |

(56) References Cited

U.S. PATENT DOCUMENTS

| | | | |
|---|---|---|---|
| 7,352,905 B2* | 4/2008 | Mukerjee et al. | 382/236 |
| 7,453,941 B1 | 11/2008 | Yamori et al. | |
| 7,555,167 B2 | 6/2009 | Srinivasan et al. | |
| 7,606,311 B2* | 10/2009 | Hsu et al. | 375/240.23 |
| 7,822,120 B2 | 10/2010 | Kondo et al. | |
| 8,428,374 B2 | 4/2013 | Srinivasan et al. | |
| 2002/0012394 A1 | 1/2002 | Hatano et al. | |
| 2002/0110196 A1 | 8/2002 | Nguyen et al. | |
| 2002/0114388 A1 | 8/2002 | Ueda et al. | |
| 2002/0131506 A1 | 9/2002 | Kerofsky et al. | |
| 2002/0168066 A1 | 11/2002 | Li | |
| 2003/0099292 A1 | 5/2003 | Wang et al. | |
| 2003/0113026 A1* | 6/2003 | Srinivasan et al. | 382/239 |
| 2003/0138150 A1 | 7/2003 | Srinivasan | |
| 2003/0142748 A1 | 7/2003 | Tourapis | |
| 2003/0156643 A1 | 8/2003 | Song | |
| 2003/0179826 A1 | 9/2003 | Jeon | |
| 2003/0202601 A1 | 10/2003 | Bjontegaard et al. | |
| 2004/0042549 A1 | 3/2004 | Huang et al. | |
| 2004/0136457 A1 | 7/2004 | Funnell et al. | |
| 2004/0141651 A1 | 7/2004 | Hara et al. | |
| 2004/0179601 A1 | 9/2004 | Kobayashi et al. | |
| 2005/0013497 A1 | 1/2005 | Hsu et al. | |
| 2005/0013498 A1 | 1/2005 | Srinivasan | |
| 2005/0036759 A1 | 2/2005 | Lin et al. | |
| 2005/0053141 A1 | 3/2005 | Holcomb et al. | |
| 2005/0053156 A1 | 3/2005 | Lin et al. | |
| 2005/0135484 A1 | 6/2005 | Lee | |
| 2005/0152457 A1 | 7/2005 | Regunathan | |
| 2005/0169374 A1* | 8/2005 | Marpe et al. | 375/240.16 |
| 2005/0254584 A1 | 11/2005 | Kim et al. | |
| 2006/0257000 A1* | 11/2006 | Boyce et al. | 382/100 |

FOREIGN PATENT DOCUMENTS

| | | |
|---|---|---|
| CN | 1293868 A | 5/2001 |
| EP | 0 279 053 | 8/1988 |
| EP | 0 397 402 | 11/1990 |
| EP | 0 526 163 | 2/1993 |
| EP | 0 535 746 | 4/1993 |
| EP | 0 540 350 | 5/1993 |
| EP | 0 542 474 | 5/1993 |
| EP | 0 588 653 | 3/1994 |
| EP | 0 614 318 | 9/1994 |
| EP | 0 625 853 | 11/1994 |
| EP | 0 651 574 | 5/1995 |
| EP | 0 771 114 | 5/1997 |
| EP | 0 786 907 | 7/1997 |
| EP | 0 830 029 | 3/1998 |
| EP | 0 863 674 | 9/1998 |
| JP | 61 205 086 | 9/1986 |
| JP | 62 213 494 | 9/1987 |
| JP | 3-001688 | 1/1991 |
| JP | 03-238970 | 10/1991 |
| JP | 05-199422 | 8/1993 |
| JP | 6-078295 | 3/1994 |
| JP | 6-078298 | 3/1994 |
| JP | 06-225279 | 8/1994 |
| JP | 06-276481 | 9/1994 |
| JP | 06-276511 | 9/1994 |
| JP | 6-292188 | 10/1994 |
| JP | 6-327001 | 11/1994 |
| JP | 07-135660 | 5/1995 |
| JP | 7-274171 | 10/1995 |
| JP | 08-502392 | 3/1996 |
| JP | 08-129128 | 5/1996 |
| JP | 08-140099 | 5/1996 |
| JP | 09-055936 | 2/1997 |
| JP | 09-322163 | 12/1997 |
| JP | 10 056 644 | 2/1998 |
| JP | 10-42295 | 2/1998 |
| JP | 10-191324 | 7/1998 |
| JP | 10-276097 | 10/1998 |
| JP | 2001-036908 | 2/2001 |
| KR | 1020020005365 | 1/2002 |
| WO | WO 98/36577 | 8/1998 |
| WO | WO 03/026315 | 3/2003 |
| WO | WO 03/043347 | 5/2003 |
| WO | WO 03/047272 | 6/2003 |
| WO | WO 2005/004491 | 1/2005 |

OTHER PUBLICATIONS

Sun et al., "Improved TML Loop Filter with Lower Complexity," ITU-T VCEG-N17, 8 pp. (Aug. 2001).

U.S. Appl. No. 60/341,674, filed Dec. 17, 2011, Lee et al.

U.S. Appl. No. 60/488,710, filed Jul. 18, 2003, Srinivasan et al.

Chen et al., "Optimizing INTRA/INTER Coding Mode Decisions," *Proc. Int'l Symp. On Multimedia Info. Processing*, pp. 561-568 (Dec. 1997).

"DivX Multi Standard Video Encoder," 2 pp. (Downloaded from the World Wide Web on Jan. 24, 2006).

Hsu et al., "A Low Bit-Rate Video Codec Based on Two-Dimensional Mesh Motion Compensation with Adaptive Interpolation," *IEEE Transactions on Circuits and Systems for Video Technology*, vol. 11, No. 1, pp. 111-117 (Jan. 2001).

ISO/IEC "Coding of Moving Pictures and Associated Audio Information," JTC1/SC29/WG11, MPEG-4 Video Verification Model 10.0 (Feb. 1998).

ISO/IEC, "JTC1/SC29/WG11 N2202, Information Technology—Coding of Audio-Visual Objects: Visual, ISO/IEC 14496-2," 329 pp. (1998).

ISO/IEC 11172-2, Information Technology—Coding of Moving Pictures and Associated Audio for Digital Storage Media at up to About 1,5 Mbit/s, 122 pp. (Aug. 1993).

"ITU-T Recommendation H.261: Video Codec for Audiovisual Services at $p \times 64$ kbits," *Telecomm. Standardization Sector of Int'l Telecomm. Union*, 28 pp. (Mar. 1993).

ITU-T, "ITU-T Recommendation H.262, Information Technology—Generic Coding of Moving Pictures and Associated Audio Information: Video," 205 pp. (1995).

ITU-T, "ITU-T Recommendation H.263 Video Coding for Low Bit Rate Communication," 162 pp. (Feb. 1998).

Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001).

Joint Video Team (JVT) of ISO/IEC MPEG & ITU-T VCEG, "Joint Final Committee Draft (JFCD) of Joint Video Specification," JVT-D157, 207 pp. (Aug. 2002).

Kim et al., "Low-Complexity Macroblock Mode Selection for H.264/AVC Encoders," *IEEE Int. Conf. on Image Processing*, vol. 2, pp. 765-768 (Oct. 2004).

Lainema et al., "Skip Mode Motion Compensation," Joint Video Team (JVT) of ISO/IEC MPEG & ITU-T VCEG (ISO/IEC JTC1/SC29/WG11 and ITU-T SG16 Q.6), Document JVT-C027, 8 pp. (May 2002).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 2002) [Downloaded from the World Wide Web on Aug. 8, 2003].

Patel et al., "Performance of a Software MPEG Video Decoder," *Proc. Of the First ACM Intl Conf on Multimedia*, pp. 75-82 (1993).

Pennebaker et al., "JPEG Still Image Data Compression Standard," Chapter 20, pp. 325-329 (1993) [no publication date].

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Sjoberg et al., "Run-Length Coding of Skipped Macroblocks," ITU-T SG15/Q.6 VCEG-M57, pp. 1-5 (Apr. 2001).

Sullivan et al., "The H.264/AVC Advanced Video Coding Standard: Overview and Introduction to the Fidelity Range Extensions," 21 pp. (Aug. 2004).

Wang et al., "Interlace Coding Tools for H.26L Video Coding," ITU-T SG16/Q.6 VCEG-037, pp. 1-20 (Dec. 2001).

(56) References Cited

OTHER PUBLICATIONS

Wien, "Variable Block-Size Transforms for Hybrid Video Coding," Dissertation, 182 pp. (Feb. 2004).

Wu et al., "Joint estimation of forward and backward motion vectors for interpolative prediction of video," *IEEE Transactions on Image Processing*, vol. 3, No. 5, pp. 684-687 (Sep. 1994).

Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (1995).

ITU-T Recommendation H.264, "Series H: Audiovisual and Multimedia Systems, Infrastructure of Audiovisual Services—Coding of Moving Video," International Telecommunication Union, pp. 1-262 (May 2003).

ITU-T Recommendation T.800, "Series T: Terminals for Telematic Services," International Telecommunication Union, pp. 1-194 (Aug. 2002).

ISO/IEC 14496-2, "Coding of Audio-Visual Object—Part 2: Visual," Third Edition, pp. 1-727, (Jun. 2004).

ITU-T, "Global Motion Vector Coding (GMVC)," VCEG-O20, 10 pp. (document marked Nov. 2001).

Bjontegaard, "Use of run-length coding to identify coded macroblocks," ITU—Telecommunications Standardization Sector, Study Group 16 Question 6, VCEG-M29r1, 4 pp. (Apr. 2001).

Heising et al., "Video Coding Using Spatial Extrapolation Based Motion Field Segmentation," *IEEE Conf. on Image Procssing*, pp. 481-484 (Sep. 1996).

Kerofsky et al., "Adaptive syntax for Mbtype," ITU—Telecommunications Standardization Sector, Study Group 16 Question 6, VCEG-M14, 6 pp. (Apr. 2001).

Sullivan et al., "Meeting Report of the Thirteenth Meeting (Meeting M) of the ITU-T Video Coding Experts Group," ITU—Telecommunications Standardization Sector, Study Group 16, VCEG-M82d1, 34 pp. (Apr. 2001).

Melanson, "VP3 Bitstream Format and Decoding Process," v0.5, 21 pp. (document marked Dec. 8, 2004).

On2 Technologies Inc., "On2 Introduces TrueMotion VP3.2," 1 pp., press release dated Aug. 16, 2000 (downloaded from the World Wide Web on Dec. 6, 2012).

Wiegand, "H.26L Test Model Long-Term No. 9 (TML-9) draft 0," ITU-Telecommunications Standardization Sector, Study Group 16, VCEG-N83, 74 pp. (Dec. 2001).

Wikipedia, "Theora," 10 pp. (downloaded from the World Wide Web on Dec. 6, 2012).

Wikipedia, "VP3," 4 pp. (downloaded from the World Wide Web on Dec. 6, 2012).

Xiph.org Foundation, "Theora I Specification," 206 pp. (Sep. 17, 2004).

Xiph.org Foundation, "Theora Specification," 206 pp. (Aug. 5, 2009).

ITU-T, "Core Experiment on Interlaced Video Coding," VCEG-059, 10 pp. (Dec. 2001).

International Organization for Standardisation ISO/IEC JTC1/SC29/WG11, N2459, "Overview of the MPEG-4 Standards," (Oct. 1998).

Joint Video Team (JVT) and ISO/IEC MPEG & ITU-T VCEG, "B Pictures in JVT," JVT-D155, Klagenfurt, Austria, 19 pp. (Jul. 2002).

\* cited by examiner

Figure 9

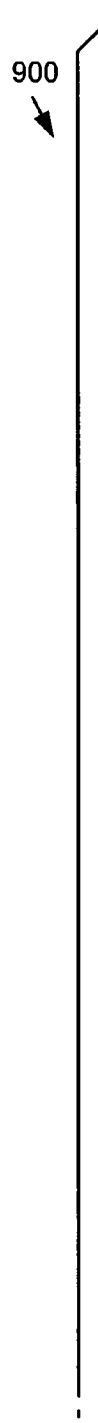

```
// constant codetables
integer array gTab0[16]  = { 0,1,1,2, 1,3,3,4, 1,3,3,4, 2,4,4,5 };
integer array gFL0[16]   = { 0,2,2,1, 2,2,2,2, 2,2,2,2, 1,2,2,0 };
integer array gCode0[16] = { 0,0,1,0, 2,0,1,0, 3,2,3,1, 1,2,3,0 };

for block = 0 to 3 do
        // BP_Y, BP_U and BP_V are 4 bit patterns or integers
        if colorformat is YUV 444 or YUV 422
            // form 6 bit JBP1
            JBP1 = [OR(BP_V):1 | OR(BP_U):1 | BP_Y:4]
                                        else if colorformat is YUV 420
            // form 6 bit JBP1
            JBP1 = [BP_V:1 | BP_U:1 | BP_Y:4]
        else if colorformat is grayscale
            // form 4 bit JBP1
            JBP1 = [BP_Y:4]
        end if JBP1 is nonzero
            JBP1chroma = JBP1 >> 4 if JBP1chroma is nonzero
                if gTab0[BP_Y] > 2
                    symbol = 8
                else
                    symbol = gTab0[BP_Y] + 5;
                end
            else
                symbol = gTab0[BP_Y] - 1;
            end // symbol takes values 0 through 4 for grayscale
            // and 0 through 8 for color
            VLC_encode (symbol) // Table 2 VLCs for grayscale
                                // Table 4 VLCs for color
    ...
```

Figure 9 (cont.)

900 (cont.) 

```
...
        if JBP1chroma is nonzero
            if JBP1chroma = 1
                putCode (0, 1)
            else
                // 2 bit codeword
                putCode (JBP1chroma, 2)
            end if symbol = 8
                if gTab0[BP_Y] = 3
                    putCode (0, 1)
                else
                    // 2 bit codeword
                    putCode (gTab0[BP_Y] - 2, 2)
                end
            end
        end putCode (gCode0[BP_Y], gFL0[BP_Y])
        // with this step, information in JBP1 is sent
        // chroma information needs to be sent for 444 and 422 if colorformat is YUV 444
            for colorplane = U and V do
                if OR(BP_colorplane) do
                    // 4 bit pattern
                    m = BP_colorplane // m > 0
                    s = number of ones in m // s > 0
                    VLC_encode (s) using Table 5
                    VLC_encode (m given s) using Table 2
                end
            end
        else if colorformat is YUV 422
            for colorplane = U and V do
                if OR(BP_colorplane) do
                    // 2 bit pattern
                    m = BP_colorplane // m > 0
                    VLC_encode (m) using Table 6
                end
            end
        end
    end
end
```

Software 1080 Implementing Block Pattern Coding

NON-ZERO COEFFICIENT BLOCK PATTERN CODING

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Block Transform-Based Coding

Transform coding is a compression technique used in many audio, image and video compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based codec 100 shown in FIG. 1 divides the uncompressed digital image's pixels into fixed-size two dimensional blocks ($X_1, \ldots X_n$), each block possibly overlapping with other blocks. In the encoder 110, a linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$).

The block transform 120-121 can be defined as a mathematical operation on a vector x of size N. Most often, the operation is a linear multiplication, producing the transform domain output y=M x, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations. The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as show in FIG. 1. While reconstructing the data, the inverse matrix $M^{31}$ (inverse transform 170-171) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks.

Block Pattern

Compression using block-transform based coding is effective because the process of quantization of a given block's transform coefficients results in the reduction of several of these coefficients to zero. The remaining non-zero coefficients are encoded in an efficient manner, thereby leading to data compression.

The efficiency of an image or video codec generally depends on the efficiency by which zero transform coefficients are encoded. In particular, a codec can achieve highly effective compression when there is a high likelihood that all the quantized coefficients in a block are zero. Such blocks may be referred to as a skipped block. Skipped blocks tend to occur in clusters, i.e., their occurrence is correlated spatially as well as across channels. This correlation can be exploited by joint coding the information across multiple blocks.

SUMMARY

A digital media coding and decoding technique and realization of the technique in a digital media codec described herein achieves more efficient encoding using block patterns. The block pattern is a joint symbol encoded to indicate which of the blocks are skipped (i.e., have all zero value coefficients, thus not explicitly coded) and which are not.

Because the block patterns can have widely varying probability distributions under different operating scenarios, entropy coding techniques based on probability distribution of symbols may not suitably compress the block patterns. For example, in high bit-rate scenarios in which little or no quantization is applied to the coefficients, there will generally be few transform coefficients quantized to zero, and consequently few block patterns representing skipped blocks. At low bit rates with high quantization, the codec generally produces many skipped blocks. In between, the codec produces a mix of skipped block patterns which are often spatially clustered.

In one representative codec illustrated herein, the codec modifies the block patterns prior to encoding to have a probability distribution better suited to compressing via entropy coding techniques. The codec adaptively chooses a prediction mode based on a backward adaptation model (e.g., observed block pattern statistics of preceding blocks). In one mode for the scenario where few block patterns of skipped blocks is observed, the block patterns are then inverted. In another mode for a spatially correlated mix of skipped/non-skipped blocks, the codec modifies the block patterns based on spatial prediction from neighboring blocks. In a further mode with many skipped blocks, the codec does not modify the block patterns. An entropy coding technique based on a probability distribution with many skipped block patterns can then provide effective compression of the block patterns.

The representative codec further applies encoding/decoding techniques that jointly code the block patterns of a cluster or region of blocks, such as a macroblock structure, to achieve further compression when encoding using block patterns.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is a pseudo-code listing of a joint block pattern encoding procedure used in block pattern coding by the encoder and decoder of FIGS. 3 and 4.

DETAILED DESCRIPTION

The following description relates to coding and decoding techniques that provide efficient coding/decoding of zero-valued coefficient block patterns (referred to herein as "Block Pattern Coding"). The following description describes an example implementation of the technique in the context of a digital media compression system or codec. The digital media system codes digital media data in a compressed form for transmission or storage, and decodes the data for playback or other processing. For purposes of illustration, this exemplary compression system incorporating this block pattern coding is an image or video compression system. Alternatively, the technique also can be incorporated into compression systems or codecs for other 2D data. The block pattern coding technique does not require that the digital media compression system encodes the compressed digital media data in a particular coding format.

1. Encoder/Decoder

Figure 2:
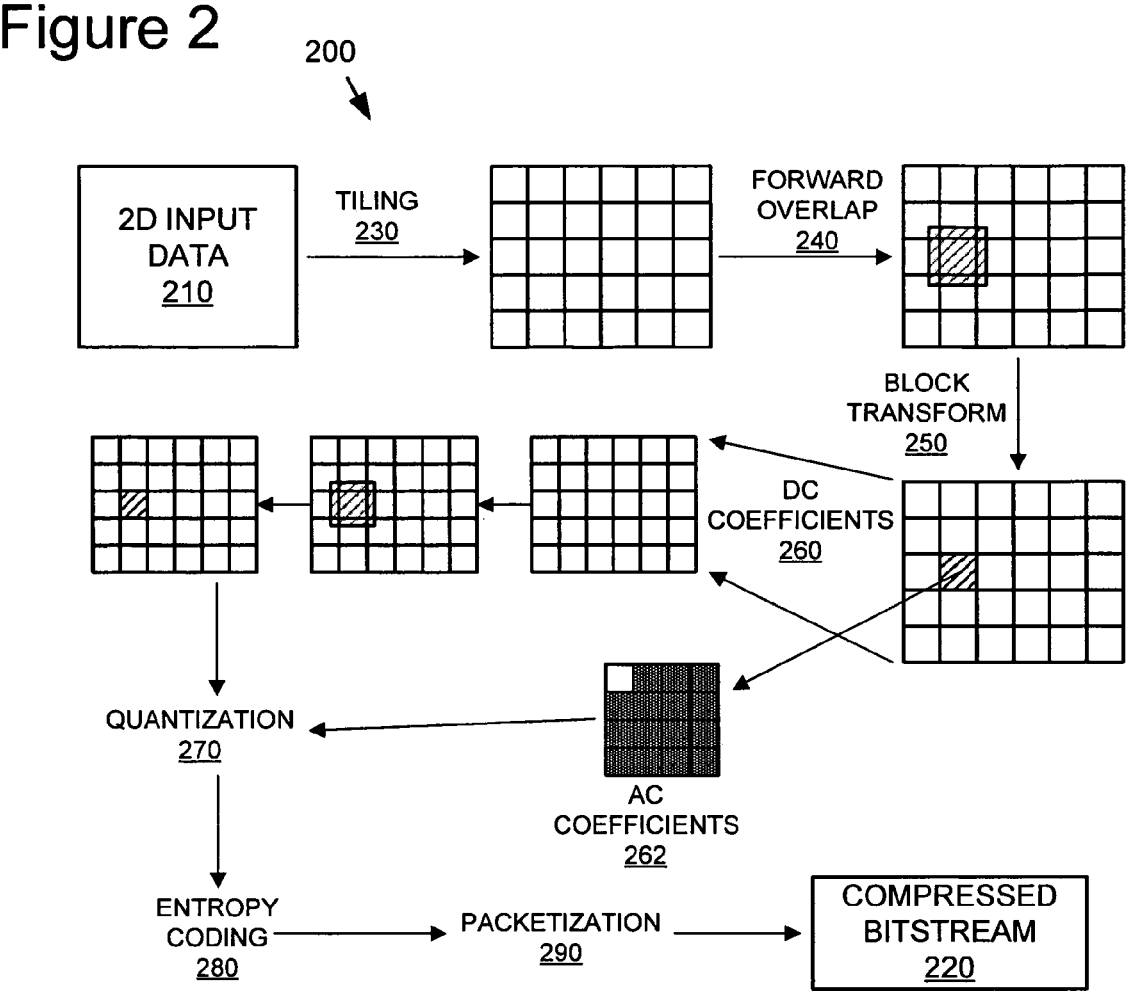
FIG. 2 is a flow diagram of a representative encoder incorporating the block pattern coding.
Figure 3:
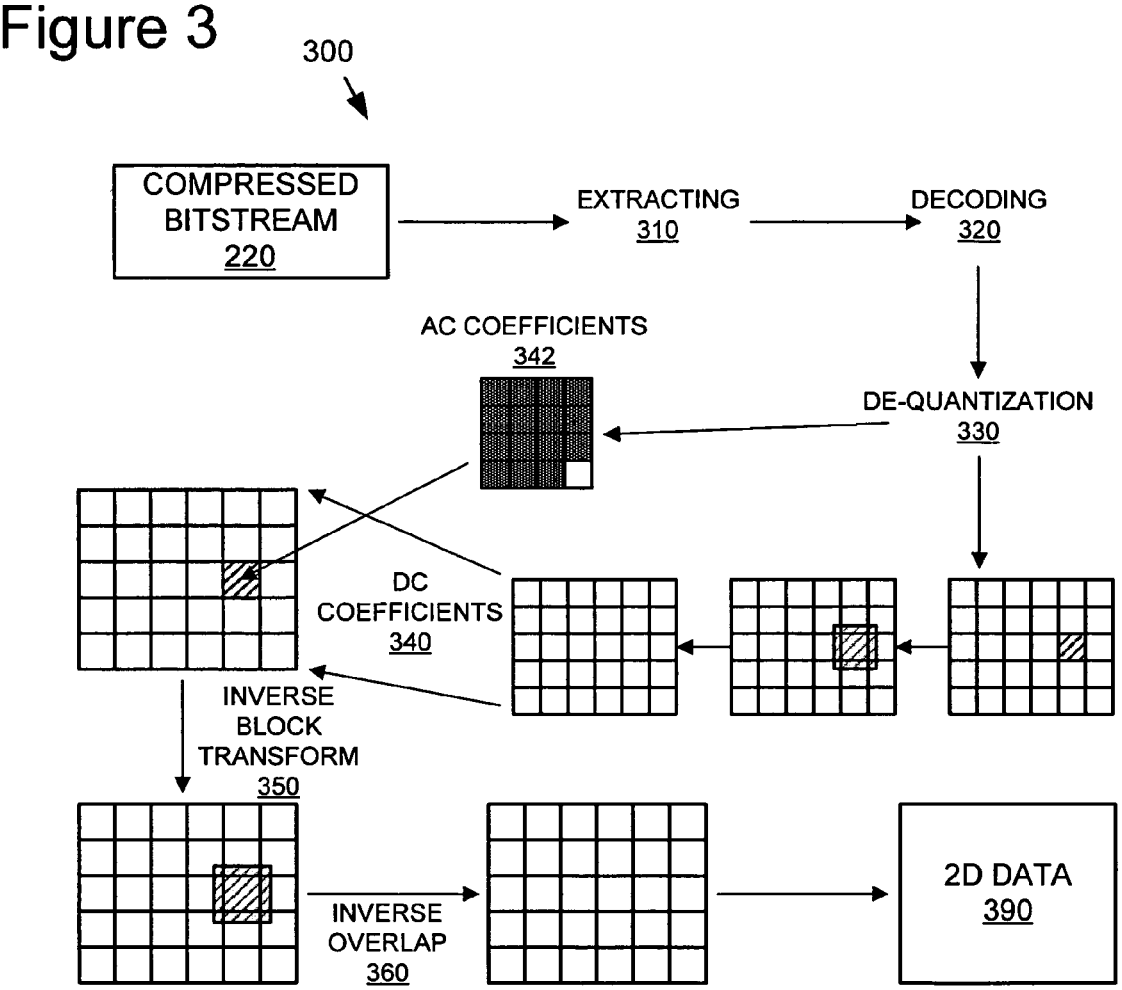
FIG. 3 is a flow diagram of a representative decoder incorporating the block pattern coding.

FIGS. 2 and 3 are a generalized diagram of the processes employed in a representative 2-dimensional (2D) data encoder 200 and decoder 300. The diagrams present a generalized or simplified illustration of a compression system incorporating the 2D data encoder and decoder that implement the block pattern coding. In alternative compression systems using the block pattern coding, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 200 produces a compressed bitstream 220 that is a more compact representation (for typical input) of 2D data 210 presented as input to the encoder. For example, the 2D data input can be an image, a frame of a video sequence, or other data having two dimensions. The 2D data encoder tiles 230 the input data into macroblocks, which are 16×16pixels in size in this representative encoder. The 2D data encoder further tiles each macroblock into 4=4 blocks. A "forward overlap" operator 240 is applied to each edge between blocks, after which each 4=4 block is transformed using a block transform 250. This block transform 250 can be the reversible, scale-free 2D transform described by Srinivasan, U.S. patent application No. Ser. 11/015,707, entitled, "Reversible Transform For Lossy And Lossless 2-D Data Compression," filed Dec. 17, 2004. The overlap operator 240 can be the reversible overlap operator described by Tu et al., U.S. patent application Ser. No. 11/015,148, entitled, "Reversible Overlap Operator for Efficient Lossless Data Compression," filed Dec. 17, 2004; and by Tu et al., U.S. patent application Ser. No. 11/035,991, entitled, "Reversible 2-Dimensional Pre-/Post-Filtering For Lapped Biorthogonal Transform," filed Jan. 14, 2005. Alternatively, the discrete cosine transform or other block transforms and overlap operators can be used. Subsequent to the transform, the DC coefficient 260 of each 4=4 transform block is subject to a similar processing chain (tiling, forward overlap, followed by 4=4 block transform). The resulting DC transform coefficients and the AC transform coefficients 262 are quantized 270, entropy coded 280 and packetized 290.

The decoder performs the reverse process. On the decoder side, the transform coefficient bits are extracted 310 from their respective packets, from which the coefficients are themselves decoded 320 and dequantized 330. The DC coefficients 340 are regenerated by applying an inverse transform, and the plane of DC coefficients is "inverse overlapped" using a suitable smoothing operator applied across the DC block edges. Subsequently, the entire data is regenerated by applying the 4=4 inverse transform 350 to the DC coefficients, and the AC coefficients 342 decoded from the bitstream. Finally, the block edges in the resulting image planes are inverse overlap filtered 360. This produces a reconstructed 2D data output. The decoder performs the reverse process. On the decoder side, the transform coefficient bits are extracted 310 from their respective packets, from which the coefficients are themselves decoded 320 and dequantized 330. The DC coefficients 340 are regenerated by applying an inverse transform, and the plane of DC coefficients is "inverse overlapped" using a suitable smoothing operator applied across the DC block edges. Subsequently, the entire data is regenerated by applying the 4=4 inverse transform 350 to the DC coefficients, and the AC coefficients 342 decoded from the bitstream. Finally, the block edges in the resulting image planes are inverse overlap filtered 360. This produces a reconstructed 2D data output 390.

In an exemplary implementation, the encoder 200 (FIG. 2) compresses an input image into the compressed bitstream 220 (e.g., a file), and the decoder 300 (FIG. 3) reconstructs the original input or an approximation thereof, based on whether lossless or lossy coding is employed. The process of encoding involves the application of a forward lapped transform (LT) discussed below, which is implemented with reversible 2-dimensional pre-/post-filtering also described more fully below. The decoding process involves the application of the inverse lapped transform (ILT) using the reversible 2-dimensional pre-/post-filtering.

The illustrated LT and the ILT are inverses of each other, in an exact sense, and therefore can be collectively referred to as a reversible lapped transform. As a reversible transform, the LT/ILT pair can be used for lossless image compression.

The input data 210 compressed by the illustrated encoder 200/decoder 300 can be images of various color formats (e.g., RGB/YUV4:4:4, YUV4:2:2 or YUV4:2:0 color image formats). Typically, the input image always has a luminance (Y) component. If it is a RGB/YUV4:4:4, YUV4:2:2 or YUV4:2:0 image, the image also has chrominance components, such as a U component and a V component. The separate color planes or components of the image can have different spatial resolutions. In case of an input image in the YUV 4:2:0 color format for example, the U and V components have half of the width and height of the Y component.

As discussed above, the encoder 200 tiles the input image or picture into macroblocks. In an exemplary implementation, the encoder 200 tiles the input image into 16×16 macroblocks in the Y channel (which may be 16×16, 16×8 or 8×8 areas in the U and V channels depending on the color format). Each macroblock color plane is tiled into 4×4 regions or blocks. Therefore, a macroblock is composed for the various color formats in the following manner for this exemplary encoder implementation:

1. For a grayscale image, each macroblock contains 16 4×4 luminance (Y) blocks.
2. For a YUV4:2:0 format color image, each macroblock contains 16 4×4 Y blocks, and 4 each 4×4 chrominance (U and V) blocks.
3. For a YUV4:2:2 format color image, each macroblock contains 16 4×4 Y blocks, and 8 each 4×4 chrominance (U and V) blocks.
4. For a RGB or YUV4:4:4 color image, each macroblock contains 16 blocks each of Y, U and V channels.

2. Block Pattern Coding Overview

The block pattern is a joint symbol encoded in the compressed bitstream by the encoder to indicate which of the blocks within some predefined cluster are skipped (i.e., have all zero value coefficients, thus not explicitly coded) and which are not. The cluster is typically a macroblock. In the representative encoder 200 (FIG. 2)/decoder 300 (FIG. 3) for example, a macroblock is a 16×16 area in the image luminance (Y) plane, and the block size of the transform is 4×4. It follows that the block pattern in this example encoder/decoder is a collection of at a minimum 16 symbols. The number of blocks in a macroblock varies in the representative encoder/decoder depending on the color format of the image, as shown in the following table. Alternative implementations of the block pattern coding in other codecs may support additional color formats and/or use other macroblock structures, having different numbers of blocks.

TABLE 1

NUMBER OF BLOCKS IN A MACROBLOCK FOR REPRESENTATIVE CODEC COLOR FORMATS

| Color Format | Number of Blocks |
| --- | --- |
| Y_ONLY (luminance only) | 16 |
| YUV_420 | 16 + 4 + 4 = 24 |
| YUV_422 | 16 + 8 + 8 = 32 |
| YUV_444 | 16 + 16 + 16 = 48 |
| CMYK/ARGB | 16 × 4 = 64 |
| N_CHANNEL | 16 × Number of Channels |

More particularly, the block pattern of an image is a collection of "bitplanes," or 2-dimensional data collection. Each bitplane corresponds to a color channel (or "color plane") which may be a luma (Y) or chroma (U and V) data (such as the various YUV color formats in the above table). Grayscale images and single channel images such as alpha (transparency) data contain only one plane of block pattern information (such as the $Y_{13}$ONLY color format in the above Table). There may be further image types (such as remapped Bayer pattern images, or CMYK printer data) that contain more than three planes. In the following description, the block pattern coding for the one and three channel data is presented as an example, although the block pattern coding can be extended to other color formats, as well.

The block pattern indicates whether the grid of 4×4 block transforms contains non-zero quantized coefficients. In other words, the block pattern macroblock can contain a pattern of Boolean value symbols indicating whether corresponding blocks contains non-zero quantized coefficients. For example, a Boolean "1" for the block pattern indicates the block contains non-zero coefficients, and a Boolean "0" symbol indicates all zero coefficients. In the latter case, encoding of individual coefficients of the block is skipped. Moreover, due to the correlated and/or sparse nature of the block pattern, it is possible to encode the information at substantially less than 1 bit per symbol. The following description presents techniques for a computationally efficient and effective encoding and decoding of this block pattern information.

2.1 Conditional Prediction

Figure 6:
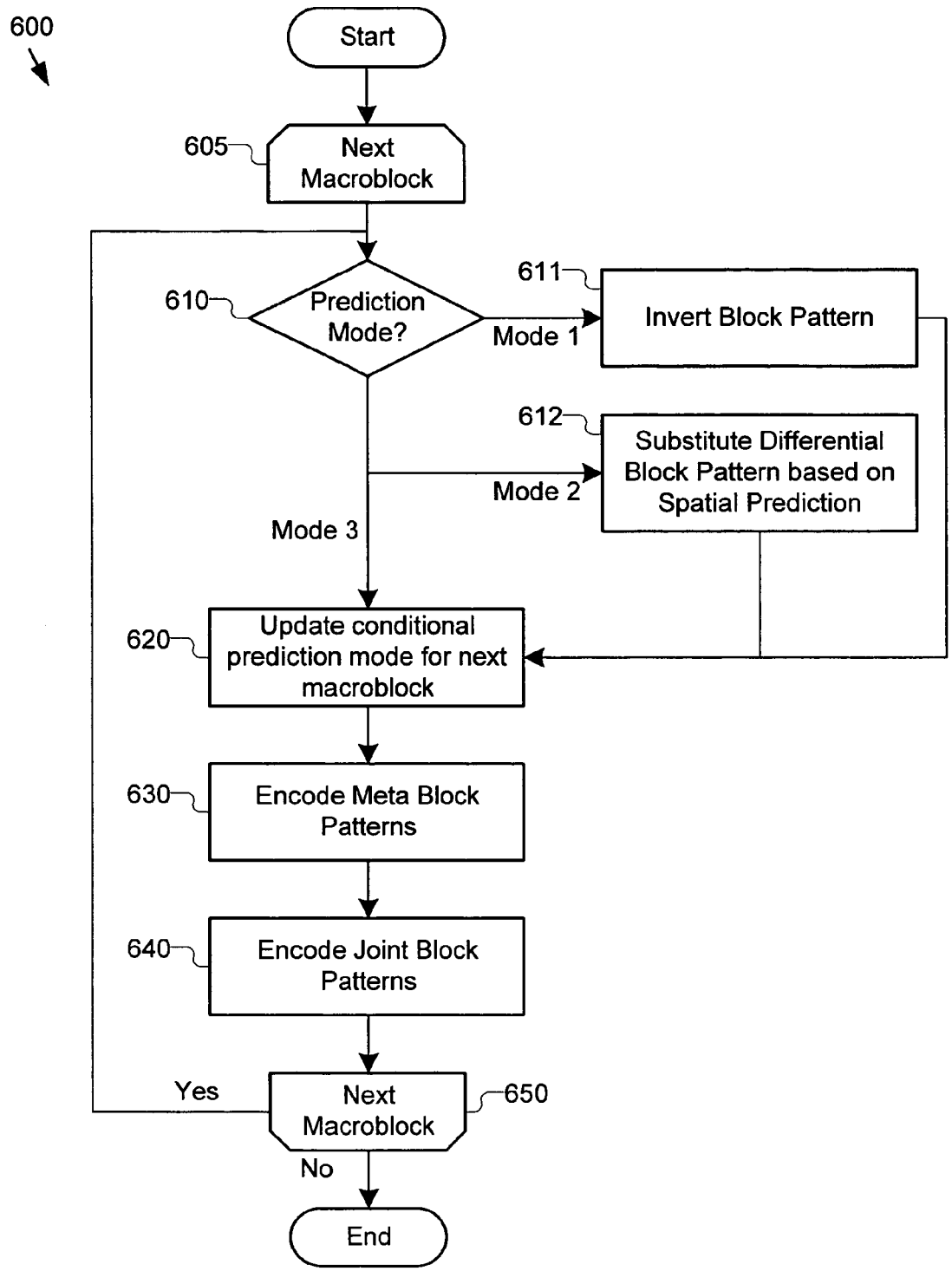
FIG. 6 is a flow diagram of an efficient block pattern coding procedure implemented in the representative encoder and decoder of FIGS. 3 and 4.

With reference to FIG. 6, the efficient block pattern coding procedure iterates through the macroblocks of the digital media data (e.g., image) to encode their respective block patterns as indicated at actions 605, 650. The representative encoder/decoder processes the macroblocks in order from left-to-right, and top-to-bottom across the digital media data. But, other processing orderings alternatively could be used.

A first conditional action 610 of the efficient block pattern coding procedure 600 uses a conditional prediction mode to attempt to remove spatial redundancies in the bitplanes. This helps to improve the compression efficiency of encoding the bit pattern using a variable length entropy coding. In the representative encoder/decoder, information is not shared between the different bitplanes (corresponding to the different color planes, such as luminance and chrominance planes) for these conditional prediction modes. In alternative encoder/decoders, the block pattern coding could share information for conditional prediction modes between the bitplanes (e.g., make predictions for coding/decoding the block pattern information based on information from other color planes in addition to the current color plane).

Under various operating conditions, the representative encoder/decoder can apply varying amounts of quantization to the digital media data, which may cause different data characteristics for the resulting block patterns. In the representative encoder/decoder, there are generally three scenarios:

1. At high bit rates (i.e. small quantization parameters), a large number of block patterns are 1.
2. At medium bit rates, there is a good mix of 0 and 1 value block patterns.
   However, 0s and 1s are often spatially clustered.
3. At low bit rates (i.e. large quantization parameters), few of the blocks have block pattern set to 1.

The block pattern coding procedure 600 responds to these scenarios by using a conditional prediction that selectively applies different block pattern coding modes, defined as follows:

Mode 1 (action 611): The block pattern of the macroblock is inverted—i.e. zeros are set to 1 and ones are set to 0.

Mode 2 (action 612): The block pattern is predicted from a neighborhood according to the spatial prediction described below.

Mode 3: The block pattern is untouched.

When the example block pattern coding technique applies Modes 1, 2 and 3 respectively to scenarios 1, 2 and 3 defined above, the net effect is the probabilistic reduction in the number of set bits in the block pattern. This skews the distribution of 1s and 0s, which helps in entropy coding groups of symbols. The Mode is chosen in a backward-adaptive manner based on causal statistics, as more fully described in Choose Prediction Mode section below. For the initial macroblock in a frame, the conditional prediction mode is initialized to Mode 2.

2.2 Spatial Prediction

Figure 4:
FIG. 4 is a diagram 400 showing block labels of transform blocks within a representative macroblock structure, along with direction of prediction of the block pattern within the macroblock.
Figure 5:
FIG. 5 is a diagram 500 designating the block from which the respective block's block pattern is predicted, using the labels shown in FIG. 4.

In the case where the conditional prediction mode is mode 2 (actions 612 in FIG. 6), the efficient block pattern coding procedure 600 performs a macroblock based spatial prediction in which the block pattern of the current macroblock is predicted from a causal neighbor. For purposes of illustration, the blocks of a macroblock are labeled as shown in FIG. 4, and FIG. 5 indicates the predictors of the blocks. For example, the predictor of the block labeled "3" as shown in FIG. 4 is the block "1" above it.

The top left block (labeled "0") whose predictor is labeled "X" is a special case, and is the only block predicted from outside the macroblock. This block's pattern is predicted as follows:

1. If the current macroblock is the top left macroblock of the frame, the predictor of block "0" is a default block pattern symbol, 1 (i.e., indicating the block contains non-zero coefficients).
2. If the current macroblock is the left most macroblock of a row (other than the first row), the predictor is block 10 of the macroblock to the top.
3. For all other cases, the predictor is block 5 of the macroblock to the left.

All blocks with labels >0 are predicted from within their macroblock. Suppose a block pattern is B, and its predictor is P. Then the output of the spatial prediction for that block is given by B ⊗ P. This quantity is referred to as Differential Block Pattern and is encoded in subsequent steps (i.e., substituting as the block pattern of the block). At decoding of macroblocks in mode 2, the inverse operation of the spatial prediction is performed on the decoder. Block patterns are regenerated by XORing (i.e., applying an exclusive OR function) their predictors with the differential block pattern.

It can be seen from FIGS. 4 and 5 that prediction in the top row of blocks within a macroblock proceeds from the left, whereas subsequent rows are predicted from the row to the top. This allows multiple predictions to be performed concurrently.

Figure 1:
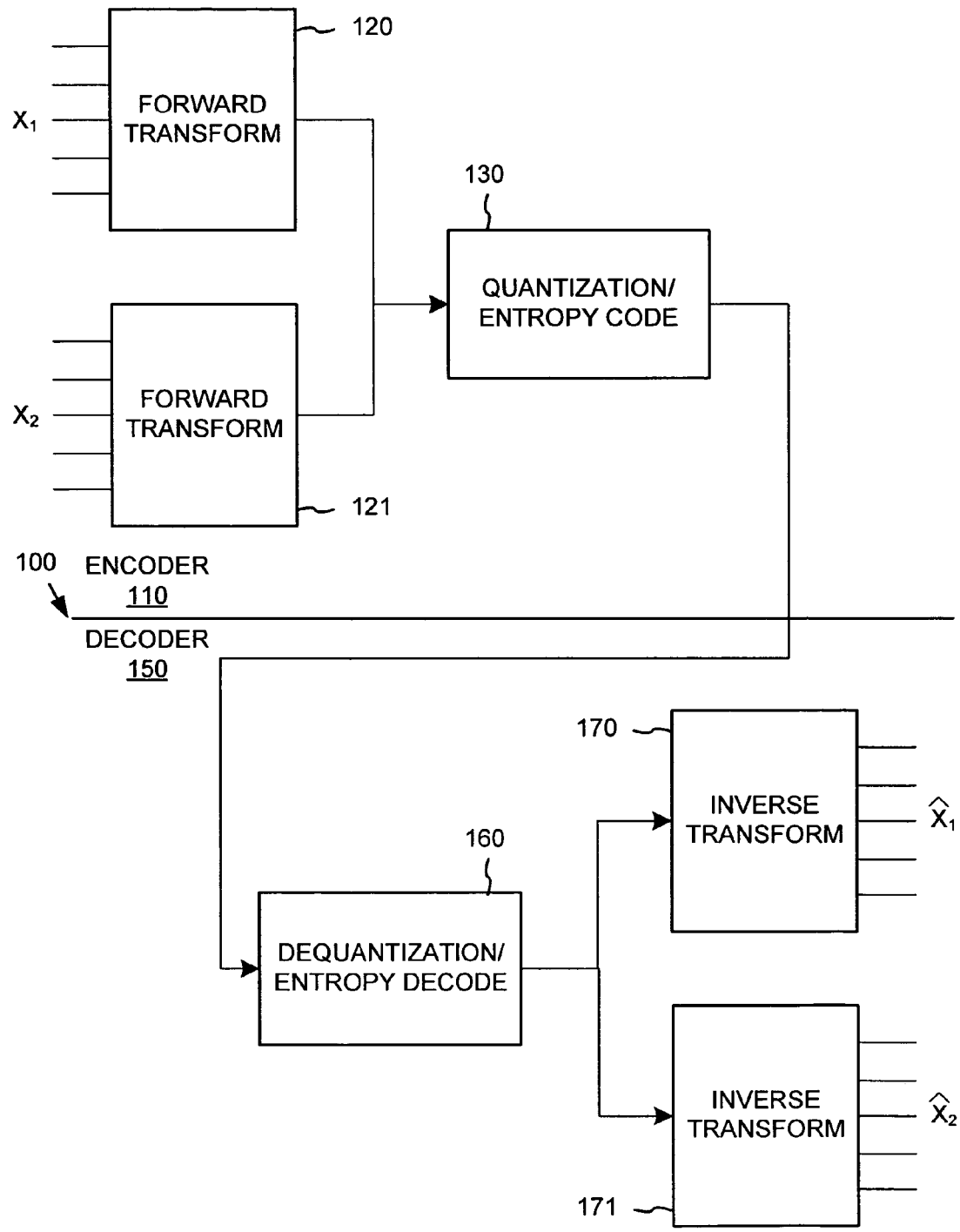
FIG. 1 is a block diagram of a conventional block transform-based codec in the prior art.

The chroma channels of 420 and 422 images are composed of 2×2 and 4×2 blocks within a macroblock. The block predictors are similar to the 444 case shown. in FIGS. 1 and 2, except that only blocks {0, 1, 2, 3} exist for 420 chroma and blocks {0, 1, 2, 3, 8, 9, 10, 11} exist for 422 chroma. The predictor of block 0 marked X is block 1 to the left, or block 2 to the top for 420/block 10 to the top for 422.

This spatial prediction takes advantage of the spatial correlation of the block pattern typical in the scenario 2 indicated above. However, the implementation of the block pattern coding in other alternative encoder/decoders can vary the particulars of the spatial predictions made in this mode. For example, the second through fourth blocks in each row (e.g., blocks labeled "3," "6," and "7" in the second row) alternatively could be predicted from the block to their left, rather than above.

2.3 Prediction Mode Adaptation

With reference again to FIG. 6, the block pattern coding procedure 600 next updates (action 620) its prediction mode (which is to be applied to the next macroblock). The choice of the prediction mode is based on a backward adaptive model (i.e., a model that adapts based on previously processed information). In the representative encoder/decoder, this adaptation model has two independent state variables which together determine the Mode of prediction, which are the above-described prediction modes 1 to 3. The two state variables are Count0 and Count 1.

These are updated after encoding/decoding the current macroblock so causality is maintained. However, alternative implementations of the block pattern coding can perform adaptation of the prediction mode at a different point of the block pattern encoding procedure, such that the decoder can also perform the like adaptation, either in a deterministic manner or based on explicit signaling from the encoder.

For the adaptation in the representative encoder and decoder, the state variables Count0 and Count1 are initialized to −4 and 4 respectively at the start of the frame or independently decodable segment. The prediction Mode is initialized to 2. The block pattern coding procedure may define and apply other content reset rules, as well.

The prediction mode updating proceeds by first updating the state variables based on the number of set bits in the block pattern for the macroblock, as follows:

$$\text{Count0}=\text{Saturate32}(\text{Count0}+F*\text{NumOnes(MBP)}-\text{AVG})$$

$$\text{Count1}=\text{Saturate32}(\text{Count1}+16-F*\text{NumOnes(MBP)}-\text{AVG})$$

where
- (a) NumOnes(MBP) is the number of set bits in the macroblock block pattern, between 0 and 16;
- (b) F=16/(number of blocks in the macroblock), i.e. F=1 for luma, and for YUV 444 chroma, F=2 for YUV 422 chroma, and F=4 for YUV 420 chroma;

$$\text{Saturate32}(x) = 15 \text{ if } x \geq 15$$
$$= -16 \text{ if } x \leq -16$$
$$= x \text{ otherwise; and}$$

- (d) AVG=3 (this is the "average" number of 1s at which modes "should be" switched).

The prediction Mode is determined subsequent to updating the state variables to be used for the next macroblock, as follows:

$$\text{Mode} = 1 \text{ if } Count1 < 0 \text{ and } Count1 \leq Count0$$
$$3 \text{ if } Count0 < 0 \text{ and } Count0 < Count1$$
$$2 \text{ otherwise}$$

In the representative encoder/decoder, the block pattern coding procedure maintains one model for the luma channel and another model is maintained for both chroma channels. Thus, there are two instances of the variables {Count0, Count1, Mode} in the codec. Further, the model which is updated after encoding/decoding the U channel block pattern is applied to the co-located V channel. Alternatively, the codec can utilize fewer (e.g., one prediction mode adaptation model for luminance and chrominance channels) or more prediction modes (e.g., separate prediction mode adaptation models per color plane) for a given digital media format (e.g., color format of an image).

2.4 Meta Block Pattern Encoding

Figure 7:
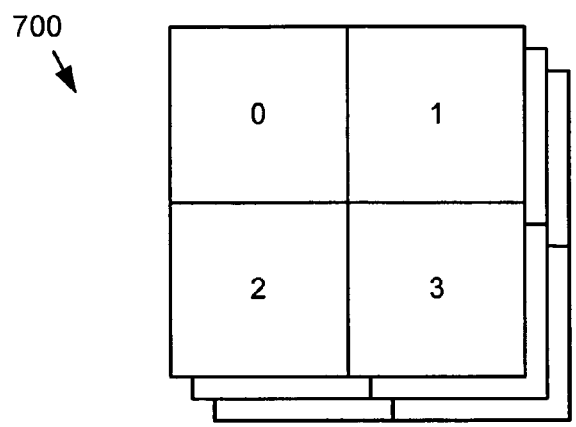
FIG. 7 is a diagram 700 showing labels of metablocks within a representative macroblock structure for meta block pattern encoding.

With reference still to FIG. 6, the block pattern coding process 600 next (at action 630) encodes the block pattern for the macroblock (as may already have been altered by applying the prediction mode in actions 610-612) using a Meta Block Pattern. In the representative encoder/decoder, the Meta Block Pattern (MBP) is defined to be a Boolean OR of block patterns of all color planes in an 8×8 area. Recall that the macroblock structure in this representative encoder/decoder is a 16×16 area, which yields a structure of 4 meta blocks per macroblock as illustrated in FIG. 7. The MBP is formed by OR-ing 4 of the 4×4 transform blocks for a grayscale image, 4×3=12 blocks for a YUV 444 image, 4+2×1=6 blocks for a YUV 420 image and 4+2×2=8 blocks for a YUV 422 image. Therefore, each macroblock in an image, regardless of color format, contains four MBPs which can be represented as a 2×2 Boolean array as shown in FIG. 7.

The MBP of a macroblock is represented by a 4 bit integer m whose kth bit is the meta block pattern of 8×8 block k. The coding of macroblock MBP m proceeds as follows:

1. The number of set bits s is counted in m. This varies from 0 through 4. s is encoded with a variable length code (VLC). This VLC is chosen from one of two code tables.

The choice of code table is made in a backward adaptive manner. The two VLCs ($VLC1_{13}A$ and $VLC1_{13}B$) used to encode s from the respective code tables are shown in the following Table 2.

TABLE 2

VLC CODE TABLES TO ENCODE THE NUMBER OF SET BITS IN META BLOCK PATTERN

| s | VLC1_A | VLC1_B |
|---|--------|--------|
| 0 | 1 | 1 |
| 1 | 01 | 000 |
| 2 | 001 | 001 |
| 3 | 0000 | 010 |
| 4 | 0001 | 011 |

2. Subsequently, another VLC is used to encode m given s. This VLC (VLC2) is shown in Table 3. The value of m given s is unique when s=0 or 4; in this case no code is sent.

TABLE 3

VLC CODE TABLE TO ENCODE THE META BLOCK PATTERN GIVEN THE NUMBER OF ITS SET BITS

| m | s | VLC2 |
|---|---|------|
| 1 | 1 | 00 |
| 2 | 1 | 01 |
| 3 | 2 | 00 |
| 4 | 1 | 10 |
| 5 | 2 | 01 |
| 6 | 2 | 100 |
| 7 | 3 | 11 |
| 8 | 1 | 11 |
| 9 | 2 | 101 |
| 10 | 2 | 110 |
| 11 | 3 | 10 |
| 12 | 2 | 111 |
| 13 | 3 | 01 |
| 14 | 3 | 00 |

On the decoder side, s is decoded from the bitstream. Given s, the next VLC symbol is uniquely decodable from which m is reconstructed.

In other alternative encoders/decoders implementing the block pattern coding, other variable length coding schemes (e.g., with various other VLC tables) could be defined for coding the MBP.

2.5 Joint Block Pattern Encoding

With reference again to FIG. 6 at action 640, the block pattern coding process 600 further encodes the block pattern for the macroblock (as may already have been altered by applying the prediction mode in actions 610-612) using a Joint Block Pattern, which specifies the block patterns of transform blocks within 8×8 meta blocks whose MBP is a set bit. The block pattern of meta-blocks whose MBP is not a set bit (indicating all zero coefficients in that meta block) need not be further coded. The Joint Block Pattern (JBP) is defined as the composition of block patterns of all 4×4 blocks indicated by a MBP. For grayscale images, JBP is composed of four Boolean values. For YUV 444, YUV 420 and YUV 422 these are respectively 12, 6 and 8 Boolean values.

For those 8×8 meta blocks whose MBP component is set, the JBP is encoded in multiple steps. In the first step, a composite JBP1 is formed as follows:

1. For grayscale images, the JBP1 of an 8×8 area is represented by a 4 bit integer whose kth bit is the block pattern of 4×4 block k. Block labels are as defined from 0 through 3, as modulo 4 of the labels in FIG. 4.

Figure 8:
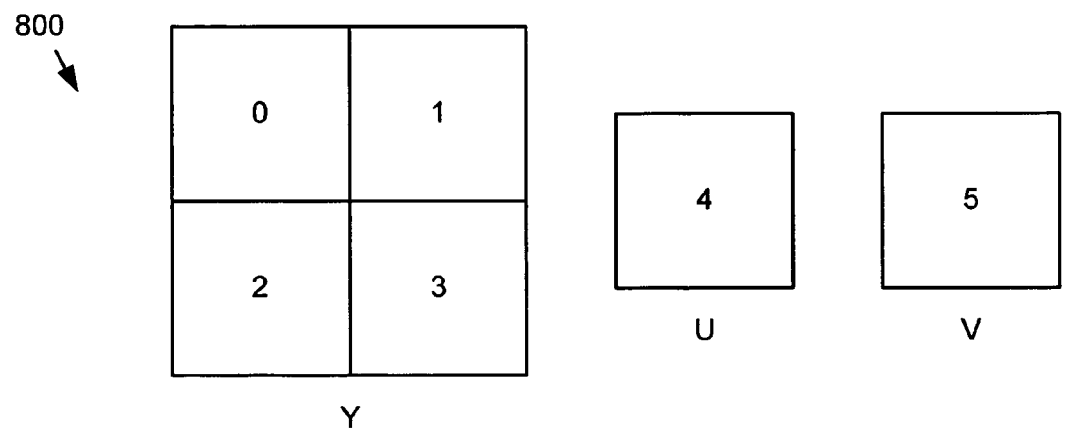
FIG. 8 is a diagram showing labels of blocks within a representative meta block structure for a YUV 4:2:0 color format.

2. For YUV 420 images, the JBP1 of an 8×8 area is represented by a 6 bit integer whose kth bit is the block pattern of 4×4 block k. Block labels are defined in YUV 420 meta block structure 800 shown in FIG. 8.

3. For YUV 444 images, JBP1 of an 8×8 area is represented by a 6 bit integer. The first four least significant bits (LSBs) are symbols that correspond to the four luminance 4×4 blocks. The remaining two bits correspond to the logical OR of 4 block patterns each of U and V blocks respectively.

4. For YUV 422 images, JBP1 of an 8×8 area is represented by a 6 bit integer. The first four LSBs correspond to the four luminance 4×4 blocks. The remaining two bits correspond to the logical OR of 2 block patterns each of U and V blocks respectively.

The composite pattern JBP1 is encoded using two variable length codes similar to the MBP described previously. The first VLC bins JBP1 and assigns a bin index. The second VLC assigns a codeword within the bin. Further, the remainder of the information in JBP not contained in JBP1 is sent. The encoding process of JBP is shown in pseudo code listing 900 in FIG. 9. The notation [X:A|Y:B] represents a bitwise concatenation of B-bits of variable Y in the least significant bits and A-bits of variable X in the most significant bits. The notation OR(A) is a logical OR of all elements of the array A. The function putCode(A,B) encodes B bits of the codeword A in the output stream.

In the pseudo code listing 900 in FIG. 9, the variable symbol is encoded with either a 5-symbol VLC table for grayscale or a 9-symbol VLC table for color. Two choices each are used for the VLC tables, and the specific table is picked in a backward adaptive manner. The two 5-symbol VLC tables for grayscale images are shown in Table 2 (which is also used in the MBP coding above). The two 9-symbol VLC tables for the luminance bitplane of color images are shown in the following Table 4.

TABLE 4

VLC CODE TABLES TO ENCODE THE
JOINT BLOCK PATTERN FOR COLOR

| s | VLC1_A | VLC1_B |
|---|--------|--------|
| 0 | 010 | 1 |
| 1 | 00000 | 001 |
| 2 | 0010 | 010 |
| 3 | 00001 | 0001 |
| 4 | 00010 | 000001 |
| 5 | 1 | 011 |
| 6 | 011 | 00001 |
| 7 | 00011 | 0000000 |
| 8 | 0011 | 0000001 |

Additionally, the joint block pattern coding procedure 900 uses the VLC code tables shown in the following Tables 5 and 6.

TABLE 5

VLC CODE TABLE TO ENCODE S FOR JOINT
BLOCK PATTERN OF YUV 444 COLORPLANES

| s | VLC |
|---|-----|
| 1 | 1 |
| 2 | 01 |
| 3 | 000 |

TABLE 5-continued

VLC CODE TABLE TO ENCODE S FOR JOINT
BLOCK PATTERN OF YUV 444 COLORPLANES

| s | VLC |
|---|-----|
| 4 | 001 |

TABLE 6

VLC CODE TABLE TO ENCODE M FOR JOINT
BLOCK PATTERN OF YUV 422 COLORPLANES

| m | VLC |
|---|-----|
| 1 | 1 |
| 2 | 01 |
| 3 | 00 |

At decoding in the decoder 300 (FIG. 3), the backward-adaptation process to choose the prediction mode is applied as described above. A decoding process that can be uniquely inferred from inverting the encoding steps detailed above for the appropriate prediction mode is then performed to reconstruct the block pattern. The block pattern is then applied in decoding the transform coefficients of the blocks indicated by that block's block pattern to contain non-zero coefficients.

3. Computing Environment

The above described encoder 200 (FIG. 2) and decoder 300 (FIG. 3) and techniques for block pattern coding can be performed on any of a variety of devices in which digital media signal processing is performed, including among other examples, computers; image and video recording, transmission and receiving equipment; portable video players; video conferring; and etc. The digital media coding techniques can be implemented in hardware circuitry, as well as in digital media processing software executing within a computer or other computing environment, such as shown in FIG. 10.

Figure 10:
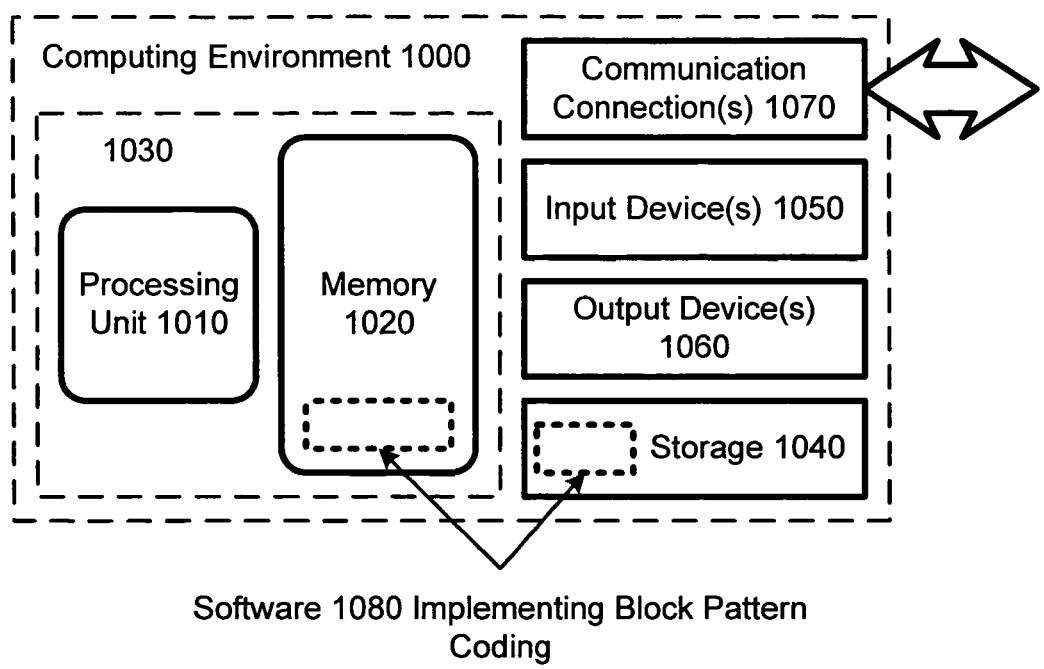
FIG. 10 is a block diagram of a suitable computing environment for implementing the adaptive coding of wide range coefficients of FIG. 4.

FIG. 10 illustrates a generalized example of a suitable computing environment (1000) in which described embodiments may be implemented. The computing environment (1000) is not intended to suggest any limitation as to scope of use or functionality of the invention, as the present invention may be implemented in diverse general-purpose or special-purpose computing environments.

With reference to FIG. 10, the computing environment (1000) includes at least one processing unit (1010) and memory (1020). In FIG. 10, this most basic configuration (1030) is included within a dashed line. The processing unit (1010) executes computer-executable instructions and may be a real or a virtual processor. In a multi-processing system, multiple processing units execute computer-executable instructions to increase processing power. The memory (1020) may be volatile memory (e.g., registers, cache, RAM), non-volatile memory (e.g., ROM, EEPROM, flash memory, etc.), or some combination of the two. The memory (1020) stores software (1080) implementing the described block pattern coding techniques.

A computing environment may have additional features. For example, the computing environment (1000) includes storage (1040), one or more input devices (1050), one or more output devices (1060), and one or more communication connections (1070). An interconnection mechanism (not shown) such as a bus, controller, or network interconnects the components of the computing environment (1000). Typically, operating system software (not shown) provides an operating environment for other software executing in the computing environment (1000), and coordinates activities of the components of the computing environment (1000).

The storage (1040) may be removable or non-removable, and includes magnetic disks, magnetic tapes or cassettes, CD-ROMs, CD-RWs, DVDs, or any other medium which can be used to store information and which can be accessed within the computing environment (1000). The storage (1040) stores instructions for the software (1080) implementing the described encoder/decoder and block pattern coding techniques.

The input device(s) (1050) may be a touch input device such as a keyboard, mouse, pen, or trackball, a voice input device, a scanning device, or another device that provides input to the computing environment (1000). For audio, the input device(s) (1050) may be a sound card or similar device that accepts audio input in analog or digital form, or a CD-ROM reader that provides audio samples to the computing environment. The output device(s) (1060) may be a display, printer, speaker, CD-writer, or another device that provides output from the computing environment (1000).

The communication connection(s) (1070) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (1000), computer-readable media include memory (1020), storage (1040), communication media, and combinations of any of the above.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. A method of encoding digital media data, the method comprising:

using a computing device that implements an encoder, applying a transform to a current cluster of blocks of the digital media data to produce a set of transform coefficients for the respective blocks;

determining a block pattern for the current cluster of blocks, wherein the block pattern comprises a pattern of symbols indicating whether encoding of coefficients in corresponding ones of the blocks in the current cluster of blocks is skipped;

conditionally, based on a prediction mode determined from causal statistics of previously encoded block patterns, applying an operation to the pattern of symbols of the block pattern for the current cluster of blocks, thereby altering the pattern of symbols such that a probability of the symbols in the block pattern having a given value tends toward a probability suited to efficient variable length entropy coding, wherein the causal statistics are maintained in two state variables that are updated based on a number of set bits in the block pattern for the current cluster of blocks and that, once updated, are used to make a determination of a prediction mode for a block pattern for a next cluster of blocks, the determination being based in part on a comparison of a first of the state variables to a second of the state variables; and encoding the block pattern in a compressed bitstream using a variable length entropy coding, wherein the compression efficiency of the variable length entropy coding relates to the probability of occurrence of the given value.

2. The method of encoding digital media data of claim 1, wherein applying the operation comprises:

inverting the symbols of the block pattern for the current cluster.

3. The method of encoding digital media data of claim 1, wherein applying the operation comprises:

performing a spatial prediction operation on the block pattern for the current cluster.

4. The method of encoding digital media data of claim 3, wherein altering the pattern of symbols based on the spatial prediction comprises:

selecting part of a block pattern of a neighboring cluster of blocks as a predictor of the block pattern for the current cluster of blocks, the neighboring cluster of blocks preceding the current cluster of blocks in order of processing; and performing a reversible combination of part of the block pattern for the current cluster of blocks with the predictor.

5. The method of encoding digital media data of claim 1, wherein said conditionally applying an operation comprises:

choosing from plural modes for applying different operations to alter the probability distribution of the block pattern based on a backward adaptive model responsive to a statistical analysis of the probability distributions of block patterns of preceding clusters of blocks; and applying the operation of the currently chosen mode to the block pattern of the current cluster of blocks.

6. The method of encoding digital media data of claim 5, wherein said operations of the plural modes comprise at least an operation by which the symbols of the block pattern for the current cluster are inverted, or an operation calculating a difference from a spatial prediction of the block pattern for the current cluster.

7. A digital media encoder comprising: a data storage buffer for storing digital media data to be encoded; a processor programmed to:

adaptively choose a block pattern prediction mode for encoding block patterns causally based on observed statistics of at least one previously encoded block pattern, where the block patterns comprise patterns of values that indicate whether respective blocks in corresponding clusters of blocks comprise non-zero coefficients or all zero coefficients, wherein the observed statistics are maintained in two state variables that are updated based on a number of set bits in the block pattern for the current cluster of block and that, once updated, are used to make a determination of a prediction mode for a block pattern for a next cluster of blocks, the determination being based in part on a comparison of a first of the state variables to a second of the state variables;

apply a block pattern modification operation to the block patterns according to the chosen block pattern prediction mode, wherein the block pattern modification operation alters a probability distribution of the block patterns to enhance compression efficiency of the block patterns using a variable length entropy coding scheme; and encode the block patterns using the variable length entropy coding scheme.

8. The digital media encoder of claim 7, wherein the processor is further programmed, when applying the block pattern modification operation to a block pattern for a current cluster of blocks when in a first block pattern prediction mode, to invert the block pattern of the current cluster of blocks.

9. The digital media encoder of claim 8, wherein the processor is further programmed, when applying the block pattern modification operation to a block pattern for a current cluster of blocks when in a second block pattern prediction mode, to alter the block pattern of the current cluster of blocks according to a spatial prediction based on a block pattern of a neighboring cluster of blocks in the digital media data.

10. The digital media encoder of claim 9, wherein the processor is further programmed to adapt the choice of block pattern prediction mode based on a number of occurrences of previously encoded block patterns indicating that the respective blocks in the corresponding clusters of blocks comprise all zero coefficients.

11. The digital media encoder of claim 7, wherein the processor is further programmed to:

encode a meta block pattern representing whether block patterns of all clusters of blocks within an area of the digital media data are indicative of all zero coefficients; and when a meta block pattern indicates that not all block patterns for the area indicate all zero coefficients, encoding the block patterns for the area using a variable length entropy coding.

12. At least one computer-readable memory or magnetic disc storing a computer-executable digital media processing program for performing a method of processing digital media data, the method comprising:

applying a transform to blocks of the digital media data to produce a set of transform coefficients for the respective blocks;

producing block patterns for the blocks of the digital media data, each of the block patterns being indicative of whether encoding of coefficients in individual blocks in respective macroblocks is skipped;

adaptively choosing a block pattern prediction mode causally based on observed statistics of at least one preceding block pattern, wherein the observed statistics are maintained in two state variables that are updated based on a number of set bits in the block pattern for the current cluster of block and that, once updated, are used to make a determination of a prediction mode for a block pattern for a next cluster of blocks, the determination being based in part on a comparison of a first of the state variables to a second of the state variables;

applying a block pattern modification operation to the block patterns according to the chosen block pattern prediction mode, wherein the block pattern modification operation alters a probability distribution of the block patterns to enhance compression efficiency of the block patterns using variable length entropy coding;

producing meta block patterns from the block patterns, each of the meta block patterns corresponding to a respective one of the macroblocks and being indicative of whether encoding of individual coefficients in groups formed from multiple blocks in the respective one of the macroblocks is skipped;

encoding the meta block patterns using variable length entropy coding; and encoding the block patterns using variable length entropy coding except those ones of the block patterns corresponding to a group in which encoding of individual coefficients is skipped as indicated by the corresponding meta block pattern for the macroblock that includes the group.

13. The at least one computer-readable memory or magnetic disc of claim 12 wherein the block pattern modification operation in one mode inverts the block patterns, and in another mode modifies the block pattern as a spatial prediction function from a predictor block pattern of a neighboring block.

14. A method of decoding digital media data, the method comprising:

using a computing device that implements a decoder, decoding a block pattern from a compressed bitstream;

applying one of multiple available block pattern prediction modes to generate a block pattern from the block pattern, the values of the block pattern indicating whether one or more coefficients in corresponding blocks of a cluster of blocks are non-zero, the applied one of the multiple available block pattern prediction modes being determined in part from a comparison of a first state variable to a second state variable, the first and second state variables being causal variables that are updated as each cluster of blocks in a frame is decoded and that are based on a number of set bits in the block pattern; and updating the block pattern prediction mode to applied to a next cluster of blocks based in part on a comparison of the first state variable to a second state variable after the first and second state variables are updated.

15. The method of claim 14, wherein one of the multiple available block pattern prediction modes comprises a mode in which the values of the block pattern are inverted.

16. The method of claim 14, wherein one of the multiple available block pattern prediction modes comprises a mode in which at least some of the values of the block pattern are predicted from a value from a previously decoded block.

17. A digital media decoder comprising:

a data storage buffer;

a processor programmed to:

adaptively choose a block pattern prediction mode causally based on observed statistics of at least one previously decoded block pattern, wherein the observed statistics are maintained in two state variables that are used to choose the block pattern prediction through a determination of a prediction mode for a block pattern for a next cluster of blocks, the determination being based in part on a comparison of a first of the state variables to a second of the state variables;

apply a block pattern modification operation to the decoded block pattern according to the chosen block pattern prediction mode and to thereby generate an original block pattern, the original block pattern comprising a pattern of values that indicates wether respective blocks in a corresponding cluster of blocks comprises non-zero coefficients or all zero coefficients.

\* \* \* \* \*